United States Patent Office 2,771,992
Patented Nov. 27, 1956

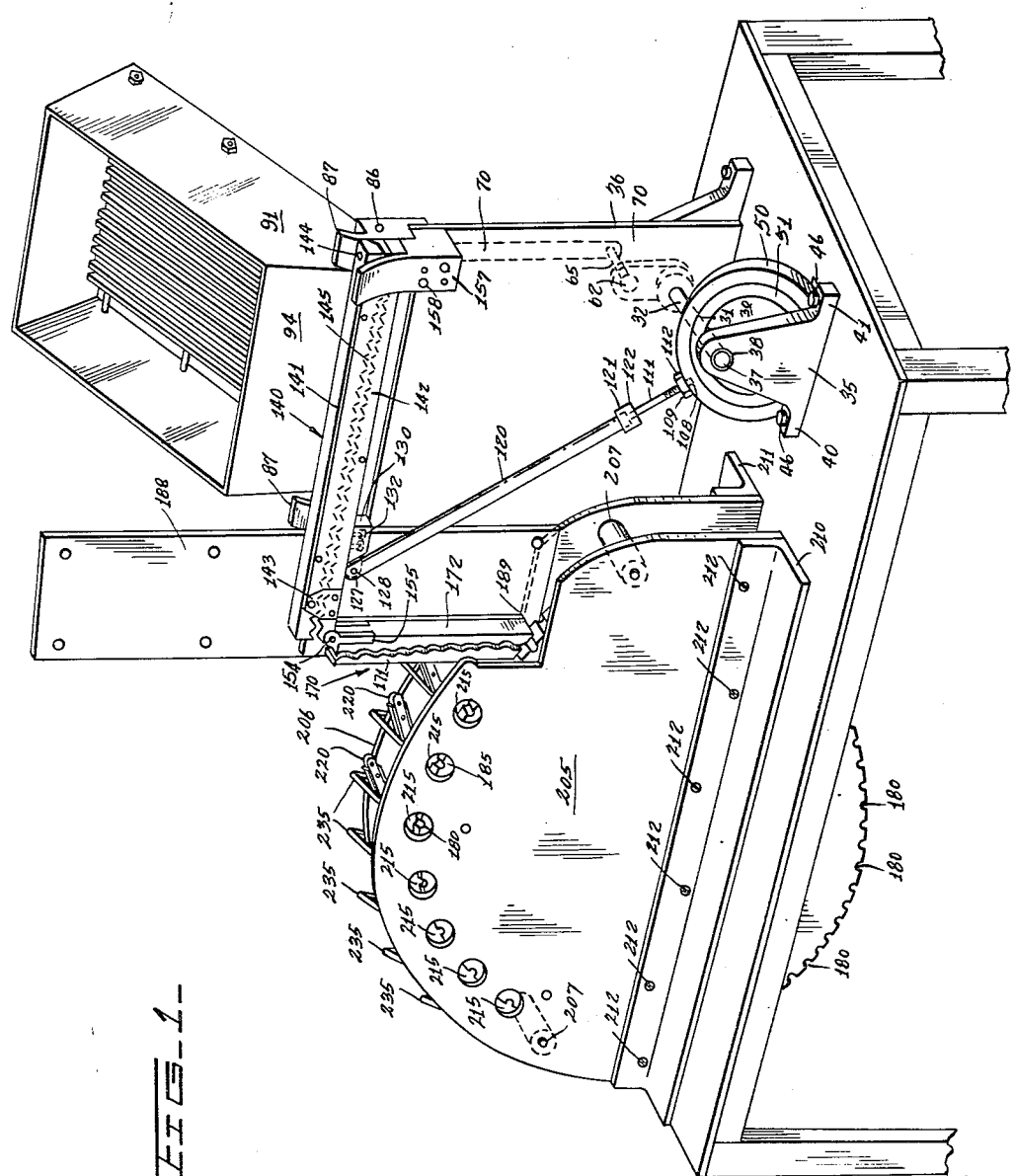

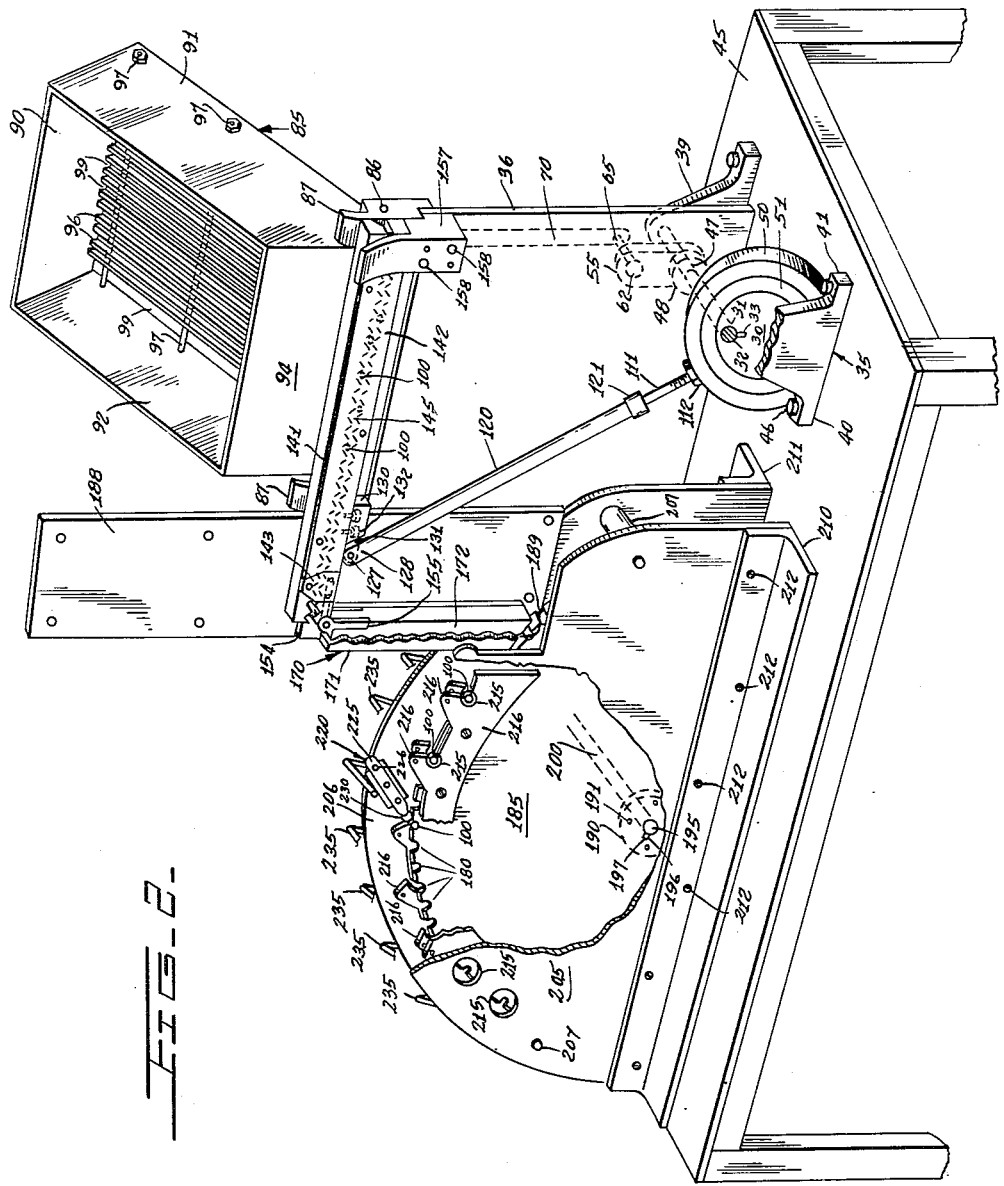

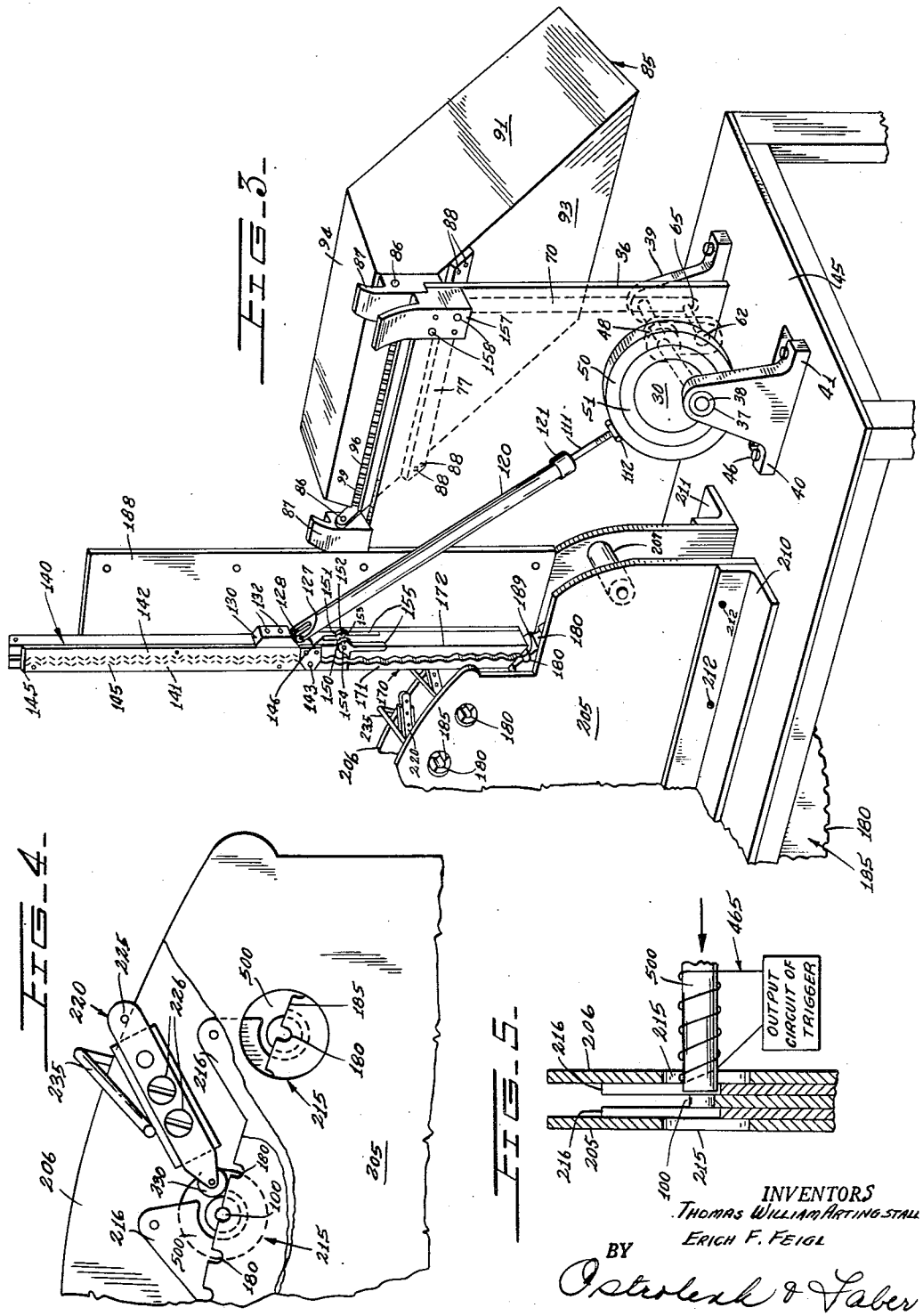

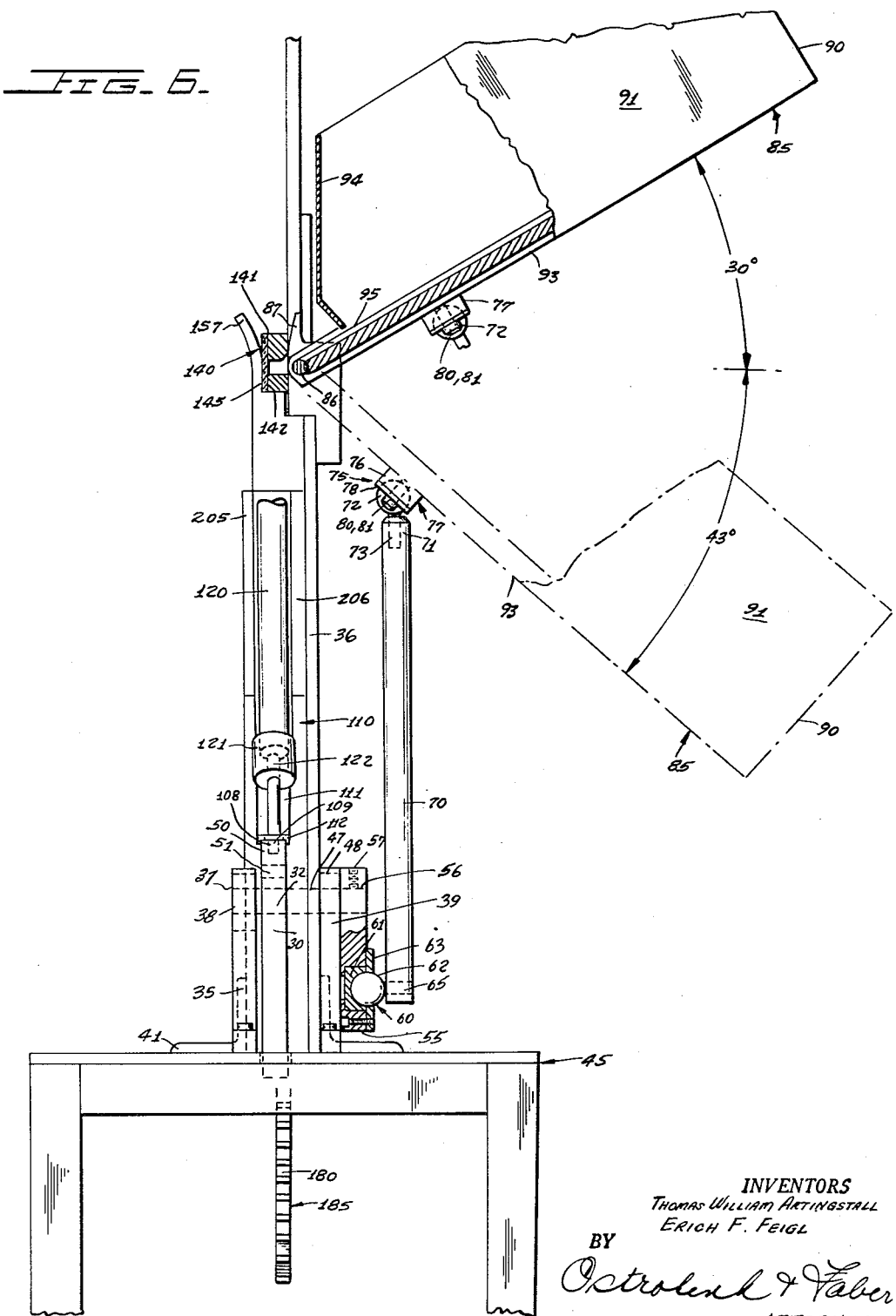

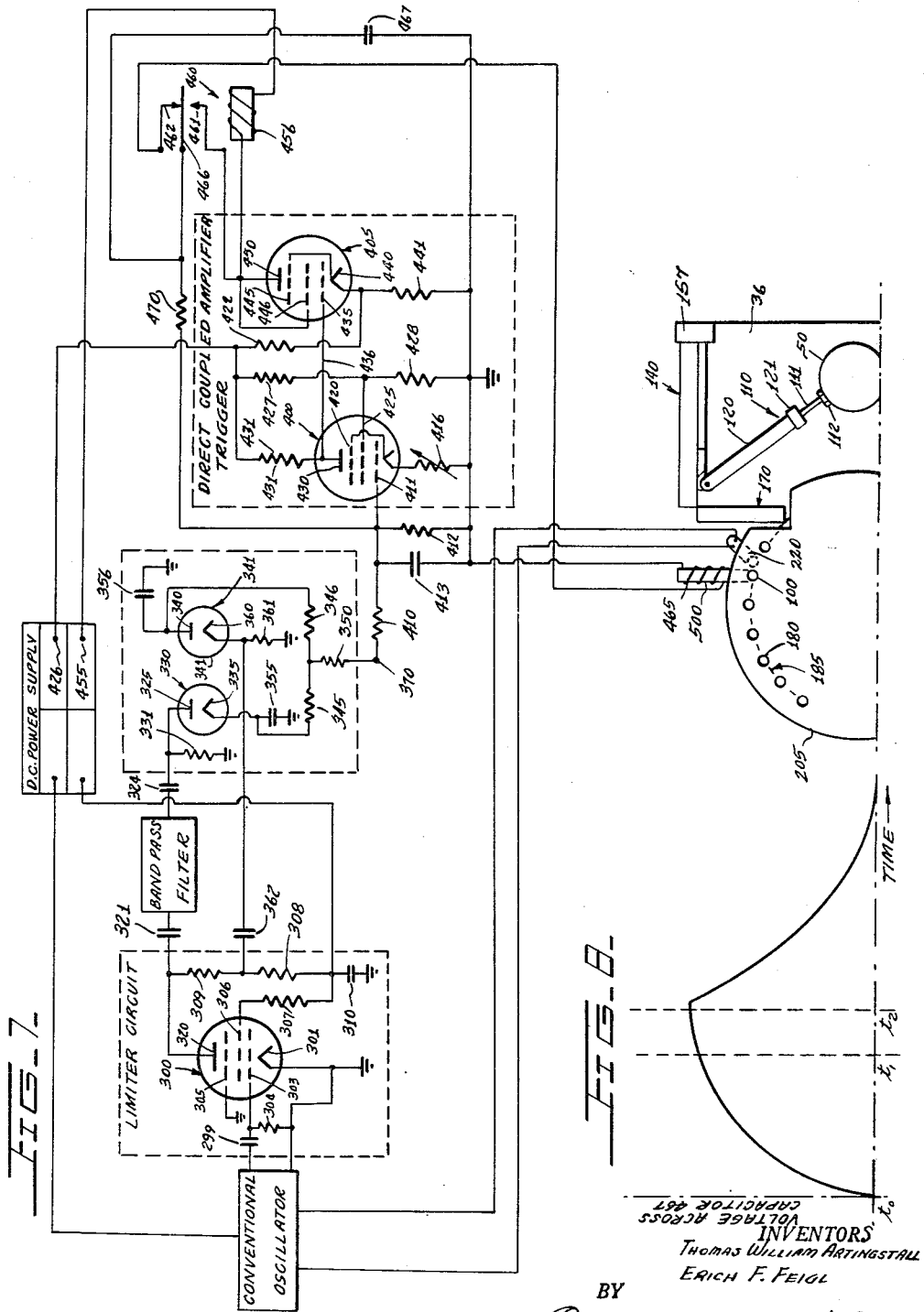

2,771,992

CAPACITOR TESTING APPARATUS

Thomas William Artingstall, Altadena, and Erich F. Feigl, Los Angeles, Calif., assignors to Solar Manufacturing Corporation, Los Angeles, Calif., a corporation of New York Application April 26, 1951, Serial No. 223,102

14 Claims. (Cl. 209—81)

Our present invention relates to equipment for testing capacitors and more specifically it relates to equipment for automatically measuring the capacitance of tubular capacitors and for automatically separating these capacitors according to their capacitance.

As is well-known in the art, capacitors may be printed by using a base material of high dielectric constant and painting silver discs of the correct area on opposite sides of the plates. The capacitance is then effectively that formed by the two silvered areas and the dielectric between them. These disc capacitors can be coated automatically, for example, as disclosed in application Serial No. 215,349 filed March 13, 1951, now Patent Number 2,664,067.

Essentially our invention contemplates a machine in which the tubular capacitors slide over a hopper into a chute and from there into a magazine. The operation of the hopper and the chute is controlled by two cam mechanisms driven by the same motor.

The magazine is in such a position that the tubular capacitors can slide down one at a time into appropriate slots of a rotating disc. On the two sides of the rotating disc are two stationary plates having a plurality of contactors. As the disc rotates, the capacitors are engaged one at a time by the contactors which are connected to a capacitance measuring electric circuit.

Each electric circuit and, therefore, each connector is tuned to measure a given capacity and if the capacitance of the tubular capacitor has the correct value for the particular contactor engaging it at that particular time, after a short delay, to allow the capacitor to disengage the contactors by a small rotation of the disc, a solenoid is energized and pushes the capacitor out of the slot it was occupying into an appropriate receptacle.

If the capacitance of the capacitor does not correspond to the capacitance to which the particular contactor circuit is tuned, the capacitor remains in the disc slot until the next contactor engages it. This process continues until the capacitor finds a contactor whose electrical circuit is tuned to its own capacitance.

If the capacitance of the capacitor does not correspond to any of the capacitances to which the various contactor circuits are tuned, the capacitor after going through those various contactors is ejected in an appropriate rejects container.

Accordingly, an object of our invention is the provision of novel apparatus and means for measuring the capacitance of tubular capacitors.

Another object of our invention is the provision of means whereby tubular capacitors are separated into different containers according to their capacitance.

A further object of our invention is the provision of means whereby the tubular capacitors are ejected from the capacitance measuring apparatus only after a definite time interval has elapsed from the capacitance measuring operation.

The various contactors are so arranged around the rotating disc that at no one instant is more than one capacitor electrically connected to its capacitance measuring circuit.

Accordingly, another object of our invention is the provision of novel capacitance measuring contactors so spaced with respect to the rotating disc that at no one instant is more than one capacitor electrically engaged by the contactor.

The rotating disc is driven by one motor while the chute and the hopper are driven by another motor in a definite time relationship so that the hopper first feeds the capacitors to the chute, the chute feeds them to the magazine and the magazine to the rotating disc.

Another object of our invention is, therefore, the provision whereby one motor drives the chute and the hopper while another motor rotates the main disc in a definite time relationship.

Each contactor is connected to a different electrical circuit consisting of an oscillator, a filter circuit, a trigger circuit, a relay and a power supply. Each oscillator is tuned so that it will resonate at a preselected frequency only when a certain capacitance is engaged by the contactor, these capacitances being different for each oscillator, but the preselected frequency being the same for all oscillators. When the right capacitance is engaged by a contactor, its oscillator produces signals which, through the filter circuit, drive the trigger circuit. The trigger circuit is essentially a direct coupled amplifier having in the output circuit a relay, a time delay circuit and a solenoid. The solenoid is energized only after a definite time interval has elapsed from the time when the signal from the oscillator has reached the input of the trigger circuit. As the solenoid is energized, its armature moves out and ejects the capacitor from the rotating disc of the capacitance measuring apparatus.

As is easily seen, each contactor must have its own oscillator, amplifier, filter circuit, trigger circuit and solenoid armature.

Accordingly, another object of our invention is the provision of a novel electrical circuit which energizes a solenoid only after a certain time interval has elapsed from the time when a signal of definite frequency has reached the input of the trigger circuit.

The foregoing and many other objects of our invention will become apparent in the following description and drawings in which;

Figure 1 is a perspective view of the capacitance measuring apparatus of our invention.

Figure 2 is a perspective view of the capacitance measuring apparatus of our invention showing the hopper, feeding tubular capacitors to the chute.

Figure 3 is a perspective view of the capacitance measuring apparatus of our invention showing the chute feeding the magazine and the magazine feeding the main rotating disc.

Figure 4 is a detailed view showing the contactors used in the capacitance measuring apparatus of our invention.

Figure 5 is a detailed sectional view of the capacitor ejecting apparatus of our invention.

Figure 6 is a side view of the capacitance measuring apparatus of our invention.

Figure 7 is a schematic view of the capacitance measuring apparatus of our invention showing the electrical circuit for one of the contactors.

Figure 8 is a curve showing the operation of the capacitor ejecting apparatus of our invention.

Referring first to Figure 1 showing the mechanism for bringing the tubular capacitors to their various positions, a disc 30 with an off the center axial opening 31 is engaged by shaft 32 which is driven by a motor (not shown). Shaft 32 engages disc 30 through the axial opening 31 and is fixed on disc 30 by means of a key 33 (see also Figure 2). Shaft 32 is supported on one side by shaft support 35 and extends through frame 36 to be supported by another triangular shaped support 39. Shaft support 35 is approximately triangular in shape with an opening 37 having a cylindrical bearing 38 on the top angle and two extensions 40, 41 on the other two angles. Shaft support 35 is mounted on base 45 by means of bolts and nuts 46 engaging extensions 40, 41 of support 35 and appropriate holes in base 45.

The vertical frame 36, also mounted in a suitable way on base 45, has a cylindrical hole 47 aligned with opening 37 of support 35. A bearing 48 aligned with hole 47 and supported by support 39 serves with bearing 38 of support 35 to permit rotation of shaft 32 around its longitudinal axis. Around disc 30 is cylindrical ring 50 and between disc 30 and ring 50 is a system of bearings 51 so that ring 50 can rotate around disc 30 and around shaft 32. Thus, rotation of shaft 32 produces a cam action in disc 30 and an up and down movement of a cam follower bearing against cylinder ring 50.

Shaft 32 (see also Figure 6) extends beyond bearing 48 on frame 36 and, at its end, carries another cam member 55. Cam member 55 is provided in fact with an appropriate opening 56 to receive shaft 32 and is secured to shaft 32 by key 57. On the other side of cam 55 (see Figure 6) is universal joint 60 consisting of a bearing 61 fixed to the cam member 55 and a spherical element 62 rotatable around its center, inside bearing 61.

A plate 63 with an appropriate opening 64 is screwed on cam 65 over spherical element 62 so that spherical element 62 cannot move out of bearing 61. Spherical element 62 has a cylindrical extension 65 rigidly connected to operating arm 70. Operating arm 70 (see also Figure 6) is approximately rectangular and carries at its other end 71 another spherical element 72. Spherical element 72 also has an extension 73 through which spherical element 72 is secured to operating arm 70. Spherical element 72 is the ball of another ball joint 75 consisting of bearing 76 fixed into a rectangularly shaped piece 77. A plate 78 with an appropriate center hole 79 is screwed at 80, 81 on the rectangular piece 77 over the ball 72 so that ball 72 cannot move out of bearing 76.

Rectangular piece 77 carries the hopper 85 to which it is secured by means of bolts and nuts 88. Hopper 85 (see also Figure 2) consists of an approximately rectangularly shaped box 85 pivoted at pivot point 86 of brackets 87 which are supported by frame 36 and attached to frame 36 by any suitable means, for example, nuts and bolts (not shown). Box 85 (see also Figure 2) comprises a back wall 90, two side walls 91 and 92, a bottom 93, and a front wall 94, which does not extend to bottom 93 but leaves a transverse rectangular opening 95 through which capacitors 100 can fall out, subdivided by strips 96, appropriately spaced by spacers 97, into a plurality of channels 99 parallel to the side walls 91 and 92. In these channels 99 are stored the tubular capacitors 100 at the beginning of the capacitance measuring operation.

As above-mentioned, rectangular piece 77 is secured to the bottom of hopper 85 in any suitable way but in such a position that when the operating arm 70 goes upwardly, with the motion of cam member 55, hopper 85 rotates in one direction around pivots 86 of brackets 87, and when the operating arm 70 goes downwardly with the motion of cam member 55, hopper 85 rotates in the opposite direction around pivots 86 of brackets 87. When hopper 85 is in its upper position, tubular capacitors 100 can slide out of hopper 85 through front opening 95 of hopper 85.

As previously mentioned, shaft 32 carries a disc 30 and around it a ring 50 with bearing between disc 30 and ring 50. Ring 50 has a cylindrical tap 108 which receives the end 109 of a cam follower 110. Cam follower 110 consists of a plunger 111 having the end 109 engaging ring 50 threaded so that a nut 112 can be screwed on it. Since this nut 112 has an overall diameter greater than that of tap 108, nut 112 threaded on end 109 of plunger 111 rests on the outer surface of ring 50 and thus regulates the overall length of cam follower 110.

Cam follower 110 further comprises a cylinder 120 which through a joint 121 connects cylinder 120 to the other side 122 of plunger 111. Joint 121 permits the lengthening or shortening of cam follower 110. The other end 123 of cylinder 120 divides into two arms 128 each having a cylindrical transverse opening 126. Openings 126 are aligned to receive a pin 127 carrying a tie bar 130. Tie bar 130 is shaped so that an extension 131 can be engaged by the two arms 128 of cylinder 120 and so that two screws 132 can easily secure tie bar 130 to the bottom of chute 140.

Chute 140 consists of two essentially rectangular sawtoothed sections 141 and 142 spaced and secured to each other by means of the steel plates 143 on one side of chute 140 and on the other side by means of screws 144. A transparent strip 145 is placed on the operation side of chute 140 to allow the operators to see tubular capacitors 100 when they are in the chute 140.

Saw-tooth section 141, shown more clearly in Figure 2, is cut in such a way as to receive easily tubular capacitors 100 when they slide down from hopper 85. Sawtooth section 142 divides itself into two curved arms 150 and 151 on the side extending beyond steel plates 143 so that they can engage a pin 146 and be secured to pin 146 by means of screws 147 which also hold, together with screw 148, steel plate 143 to sections 141 and 142 of chute 140.

Pin 146 is rectangular in shape and has a cylindrical extension 152 with a transverse cylindrical opening 153 to be engaged by rod 154 held by pivot member 155 which has the same curvature of the two arms 150 and 151 of chute 140 so that the two curved arms 150 and 151 and, therefore, chute 140 can rotate around pivot member 155 or more precisely around rod 154.

The end 156 of chute 140 opposite to pivot member 155 rests on a bracket 157 secured to frame 36 in an appropriate way, for example, by means of bolts and nuts 158. When cam follower 110 is pushed upwardly by cam 50, it rotates chute 140 from a horizontal position to a vertical position so that tubular capacitors 100 occupying the free section between the saw-tooth sections 141 and 142 can slide down chute 140 by force of gravity. Chute 140 is filled with tubular capacitors 100 when hopper 85 operated by cam follower mechanism 55 rotates to such a position that tubular capacitors 100 stored in hopper 85 can slide into chute 140 before chute 140 starts moving from the horizontal position to the vertical position.

As previously mentioned, both cams 50 and 55 are driven by the same motor and the cam followers 110 and 70, respectively, are placed in such a position on their respective cams 50 and 55 that the above described events occur in the right time sequence.

More particularly, when chute 140 is in the horizontal position, it has been fed by hopper 85 so that the space between its saw-tooth sections 141, 142 is completely filled with capacitors 100. At this time, hopper 85 is in the feeding position, i. e., in its uppermost position. As hopper 85 moves down during the continuation of this cycle to its lowermost position, the saw-tooth chute 140 will be oscillated in a vertical position. This is achieved by the upward motion of cam follower 110 after hopper 85 has been moved to its uppermost position by cam follower 70.

At this vertical position of the chute 140, capacitors 100, to be separated, are fed down into magazine 170. Magazine 170 consists of two essentially rectangular members 171 and 172 which together form an S-like chamber through which the capacitors 100 fed by chute 140 can slide down to appropriate openings 180 of rotating disc 185. Magazine 170 is secured in its correct position to a second metallic fame 188 together with pivot member 155 in any suitable way, and frame 188 is supported on base 45 as hereinafter described.

As previously mentioned, tubular capacitors 100 fall from lower opening 189 of S-like chamber 170 into slots 180 of the main rotating disc 185. Rotating disc 185 has a plurality of slots 180 to receive tubular capacitors 100 when slots 180 are situated directly below the lower opening 189 of S-like chamber 170. Rotating disc 185 can be made of any suitable insulating material, for example, "Bakelite."

Slots 180 in disc 185 are so shaped that not only can they receive tubular capacitors 100 but they also secure capacitors 100 to disc 185. Disc 185 has in its center a hub 190. Hub 190 is secured to disc 185 in any suitable way, for example, by means of bolts and nuts 191. Hub 190 has a center opening 195 and a keyway 196 which can receive a key 197 to secure hub 190 and, therefore, disc 185 to shaft 200.

On the two sides of disc 185 are two plates 205 and 206. Plates 205 and 206 are spaced from each other by means of spacers 207 and are situated on the common base 45 by means of angular supports 210, 211 which are secured to plates 205 and 206 and base 45 in any suitable way, for example, by means of bolts and nuts 212.

As shown more clearly in Figure 2, plates 205 and 206 have an interior saw-tooth contour with cylindrical openings 215 at the bottom of saw-tooth 216. In this particular embodiment of our present invention, the number of cylindrical openings 215 is seven, seven being the capacitors to be selected. Openings 215 allow tubular capacitors 100 to be ejected from rotating disc 185 after they have been engaged by contactors 220 whose circuits are tuned for that particular value of capacitance, as hereinafter described in connection with the electrical circuit.

The previously mentioned frame 188 is actually an extension of back plate 206. A plurality of contactors 220 (in this case seven) are secured to the same back plate 206 in seven different positions corresponding to the positions of openings 215 or actually so positioned that tubular capacitors 100 first are engage by them and then rotate to a position aligned with openings 215.

In the present embodiment, the number of capacitors 100 to be sorted is seven. Thus, the number of contactors 220 is also seven, the first contactor 220 only testing for shorts.

Contactors 220 (see also Figure 4) consist of two contact holders 225 secured to each other but also insulated from each other by means of bolts and nuts 226. Contact holders 225 are provided with contact rollers 230. Contactors 220 are secured and rockable on the two plates 205 and 206 by torsion springs 235. Contactors 220 are further connected to an electrical circuit for the measurement of the capacitor 100. This electrical circuit will be described hereinafter. These contactors 220 are so placed around the circumference of rotating disc 185 that at no one instant is more than one capacitor engaged by disc contactors 220.

Referring now to Figure 2, as the main rotating disc 185 moves driven by its motor (not shown), first capacitors 100 fall from the lower opening 189 of magazine 170 into slot 180 of disc 185. By further rotation of disc 185, capacitor 100 is engaged by the first of the seven contactors 220 which, as above-mentioned, tests for shorts in the capacitor 100. If there are shorts in the capacitor 100 under test, after an appropriate time delay to allow capacitor 100 to disengage from first contactor 220, capacitor 100 is ejected from slot 180 of rotating disc 185 as hereinafter described in connection with the electrical circuit.

If capacitor 100 does not have any shorts, it is engaged by the second contactor 220 and if the capacitance of capacitor 100 has the value to which the electrical circuit connected to second contactor 220 is tuned, then after an appropriate time delay, capacitor 100 will be positioned directly opposite openings 215 of plates 205, 206.

At this instant, the capacitors are ejected from rotating disc 185 as hereinafter described and fall into a suitable container (not shown). If the capacitance of the capacitor 100 is not the one corresponding to second contactor 220, capacitor 100 remains on disc 185 and is tested again after appropriate rotation by disc 185 by third contactor 220. If the capacitance of capacitor 100 corresponds to that to which electrical circuit of third contactor 220 is tuned, capacitor 100 is ejected into a second container (not shown). If the capacitance of capacitor 100 has not that value, capacitor 100 will continue rotating with disc 185 to the next contactor 220.

Finally, if the capacitance of capacitor 100 is such that capacitor 100 is not ejected from the rotating disc 185 after having engaged all available contactors 220, capacitor 100 is ejected from rotating disc 185 into a reject container (not shown).

The rotating disc 185 is driven in a different time relationship with respect to disc 50 so that it always presents unfilled slots 180 to the lower opening 189 of magazine 170 and this is obtained by rotating the shafts 32 and 200 at different speeds, for example, at 11.5 R. P. M. and 1.9 R. P. M., respectively.

Basically the machine involves inserting the capacitor to be tested into an oscillator circuit so that the oscillator will oscillate at a frequency $f_0$, in the particular example here given at one megacycle. The output of the oscillator is passed through a band filter so as to pass only signals which are generated from the output of the oscillator which are approximately $f_0$ or in this case one megacycle. The output of the filter in turn is applied to a trigger circuit which in turn has an output circuit connected to a relay which relay, if it is energized, operates a solenoid plunger which kicks the selected capacitor out into a chute or box.

There are as many oscillators as there are ranges of capacitances to be selected. If, for example, there are six particular groups of capacitors into which the division is to be made, there would be six oscillators. The capacitor first is connected to a breakdown point which determines whether or not there is a short in the capacitor. If there is a short, this will energize a solenoid which is adjacent to the capacitor at this position and kick the capacitor into a selected box.

At the second position, the capacitor is electrically and automatically connected into the first oscillator. If its capacitance now is such that the oscillator will oscillate at $f_0$, the above-described operations will be performed. The solenoid adjacent to the capacitor will be energized to kick the capacitor into the selected box.

If the capacitor does not have the capacitance for oscillating the oscillator at the frequency $f_0$, no signal from the oscillator will pass the band pass filter. The mechanism then moves the capacitor being tested to the next position in a continuous motion. At this next position, the above-described operations are repeated in a second oscillator. The second oscillator is so adjusted that for a different capacitance than that previously involved the oscillator will oscillate at the frequency $f_0$, and this is repeated at all of the positions.

Each oscillator must thus operate at the frequency $f_0$ but will require a different capacitance of the capacitor being tested to oscillate at $f_0$.

It is highly desirable that in testing the capacitors they be tested with oscillators oscillating at $f_0$ (one megacycle). When tested with a single frequency of this nature the Q remains constant and the test of the capacitor's capacitance is made more accurate, that is, the testing should be done at a predetermined constant frequency which may be one megacycle or some other but should always be a constant whatever it is.

In the actual mechanism employed, as previously described in connection with Figures 1, 2, and 3, the capacitors are fed from a hopper to a rotating member and are fed to a position at which a good electrical contact is made with the first oscillator with which it is to be tested. The oscillator employed is a standard type of Hartley oscillator ("conventional oscillator" of Figure 7). It is in this particular instance chosen to oscillate at one megacycle if the capacitance is correct for that particular tested capacitor.

Referring now to Figure 7 showing the electrical circuits for one of the contactors and its corresponding capacitor ejecting mechanism, an oscillator of any known type is tuned to resonate at a frequency $f_0$ (in this case $f_0$ equal to one megacycle) when the capacitor 100 engaged by the contactor 220 has the correct capacitance.

To the output of the "conventional oscillator" is connected, through coupling capacitor 299, the "limiter circuit" consisting of a pentode 300 having the cathode 301 connected to ground; the control grid 303 connected to ground through grid leakage resistor 304, the suppressor grid 305 connected to ground, the screen grid 306 connected to the D. C. power supply through resistor 307, the plate 320 connected to the D. C. power supply through resistors 308 and 309 and the capacitor 310 connected between resistors 307, 308 and ground.

Plate 320 is connected to a "band pass filter" of any conventional type and capable of passing only signals having a frequency in the neighborhood of $f_0$ (in this case one megacycle).

Plate 320 is connected to the "band pass filter" through a coupling capacitor 321 and the output of this "band pass filter" is connected through another coupling capacitor 324 to plate 325 of diode 330. A resistance 331 is connected on one side to capacitor 324 and plate 325 and on the other to ground.

Cathode 335 of diode 330 is connected to plate 340 of second diode 341 by means of resistors 345 and 346. Resistors 345 and 346 are of the same magnitude and at the point at which resistor 345 makes contact with resistor 346 is connected another resistor 350, the other terminal 370 of resistor 350 being the input terminal to the direct coupled amplifier.

Cathode 335 of diode 330 is by-passed to ground by capacitor 355. Plate 340 of diode 341 is also by-passed to ground by capacitor 356, while cathode 360 of diode 341 is connected to ground through resistor 361 and to the connecting point of resistors 308 and 309 through coupling capacitor 362.

As is now apparent, the circuit comprising diodes 330 and 341 and their associated electrical elements is what amounts to a standard Wheatstone bridge circuit.

"Direct coupled amplifier-trigger circuit" consists of two tubes 400 and 405 direct coupled. More particularly, output terminal 370 from the rectifier circuit is connected to one side of resistor 410, the other side of resistor 410 being connected to control grid 411 of pentode 400. Control grid 411 is connected to ground through a grid leakage resistance 412 and the by-pass capacitor 413. Cathode 415 of pentode 400 is connected to ground through grid biasing resistor 416. Suppressor grid 420 is connected to cathode 415 while screen grid 425 is connected to the D. C. power supply 426 (in this case of 180 volts) through resistor 427 and to ground through resistor 428. The potential of screen grid 425 is, therefore, a function of the values of resistors 427 and 428. Plate 430 of pentode 400 is connected through resistor 431 to the D. C. power supply 426. Plate 430 of pentode 400 is also directly connected to the control grid 435 of second amplifier pentode 405 through conductor 436. Cathode 440 of pentode 405 is connected to ground through resistor 441 and is connected to the D. C. power supply 426 through resistor 42.

Therefore, the potential of cathode 440 is the function of the values of resistors 441 and 442 and thus the voltage between grid 435 and cathode 440 is also a function of resistors 441 and 442.

Suppressor grid 445 is connected to cathode 440 while screen grid 446 is connected to plate 450 of pentode 405. Plate 450 of tube 405 is connected to another power supply 455 through coil 456 of relay 460. Plate 450 of tube 405 is further connected to lower stationary contact 461 of relay 460. Upper stationary contact 462 of relay 460 is connected to ground through solenoid coil 465.

The relay armature 466 of relay 460 is connected to ground through a large capacitor 467. Relay armature 466 is also connected to grid 411 of tube 400 through a resistor 470. Relay armature 466 is biased by any appropriate means to stationary contact 462. When a capacitor 100 having the correct capacitance is engaged by the responding contactor 220, the "conventional oscillator" will resonate at the frequency $f_0$.

Since the output of the conventional oscillator is connected to the input of the limiter tube 300 and the plate 320 of limiter tube 300 is connected to the "band pass filter," only signals having a frequency in the neighborhood of $f_0$ will pass through this "band pass filter," all other frequency signals being blocked by the "band pass filter."

Limiter tube 300 functions primarily to make certain that the amplitude of the output signal from its plate 320 will be of a constant value irrespective of the amplitude of the signal coming from the "conventional oscillator."

If, then, the signal from the output of tube 300 is of the correct frequency $f_0$, or in the neighborhood of frequency $f_0$, it will pass through the "band pass filter" through coupling capacitor 324 and will be impressed on the plate 325 of diode 330. The signal from the output of tube 300 will also be applied to the cathode 360 of diode 341, through coupling capacitor 362. It will be noticed that the two diodes 330 and 341 and the two resistors 345 and 346 constitute what amounts to a standard Wheatstone bridge circuit.

When the output from the first diode 330 equals the output from the second diode 341, which happens to be a reference diode, then the current flowing in the resistors 345 and 346 are equal and, therefore, no current flows in the resistor 350.

When, on the other hand, the current from the "band pass filter" and through the diode 330 is larger than the current flowing in the reference resistor 346, there will be a resultant current flow through resistor 350 which produces a negative voltage across resistor 350.

As previously mentioned, the output from resistor 350 is applied to the input of tube 400 of the trigger circuit. Tube 400 is normally conductive and when the negative potential from resistor 350 is applied to the grid 411 of tube 400 and drives grid 411 below the cut-off voltage of tube 400, tube 400 is cut off so that no current will flow through tube 400 and the plate 430 will have a voltage equal to the voltage of the power supply 426.

On the other hand, tube 405 is normally non-conducting but now grid 435 being connected to plate 430 of tube 400 through conductor 436 becomes positive and more precisely it acquires, together with plate 430, the voltage of power supply 426. This makes tube 405 conductive and a current will flow from power supply 445 through coil 456 of relay 460 to plate 450 of tube 405 and from there to cathode 440 and thence through resistor 441 to ground. This current energizes relay 460 so that relay armature 466 will be attracted toward stationary contact 461, thus connecting the plate supply 445 across capacitor 467. A locking circuit is thus completed from the power supply 455 through coil 456 of relay 460 over stationary contact 461 and relay armature 466 to capacitor 467. By reason of the particular design of capacitor 467, capacitor 467 has a predetermined charging time which may be of any value desired.

At the same time, there will be another current flowing from power supply 445 through resistors 470 and 412 to ground. This current because of the large value of resistors 470 and 412 produces only a small positive potential on grid 411 of tube 400, such that it will not affect the nonconducting state of tube 400.

In the meantime, capacitor 100 is moved by rotating disc 185 out of engagement with contactor 220, thus removing the negative signal from the grid 411 of tube 400 and making tube 400 conductive again. Plate 430 then drops to a voltage lower than that of the D. C. power supply 426, and with it grid 435 of tube 405, thus making tube 405 non-conducting again. This does not charge the locking circuit since now there is current flowing through coil 456 of relay 460 from the power supply 455 to capacitor 467, charging capacitor 467.

That is, capacitor 467 now connected across power supply 455 through stationary contact 461 and armature 462 of relay 460 will start charging to the voltage of power supply 455, in this case 300 volts. As capacitor 467 charges, the current through capacitor 467 decreases in value until capacitor 467 is completely charged. Then there will be no current flowing through coil 456 of relay 460.

Therefore, relay 460 is now de-energized and relay armature 466 being biased towards stationary contact 462 will return to the position in which it makes contact with stationary contact 462. Capacitor 467 is, therefore, now connected across solenoid 465 and starts discharging through solenoid 465. This discharging current energizes solenoid 465 and moves armature 500 (see also Figure 5) of solenoid 465 out of solenoid 465.

As previously mentioned, plunger 500 of solenoid 465 then ejects capacitor 100 from slots 180 of main rotating disc 185 into an appropriate container.

The action of relay 460, solenoid 465 and capacitor 467 is seen more clearly in connection with Figure 8.

Figure 8 shows the variation of the voltage across capacitor 467 in function of time. The time origin $t_0$ is chosen to be that at which relay 460 is energized and attracts relay armature 466 toward stationary contact 461. At time $t_1$ the capacitor 100 under test leaves contactors 220. At time $t_2$ capacitor 467 is completely charged and relay armature 466 swings back to stationary contact 467, thus connecting solenoid 465 across capacitor 467.

At this same time, $t_2$, plunger 500 of solenoid 465 is pushed by solenoid 465 out of solenoid 465. After time $t_2$ capacitor 467 continues its discharge through the circuit consisting of resistor 470 and resistor 412 until the next capacitor ejecting operation so as to prevent the discharge current from the capacitor 467 from flowing back into the first tube and repeating the above-described operation.

The above timing operation has been introduced because at the time that the capacitor 100 is being tested, a good contact engagement with the conventional oscillator is essential. With such good contact, it is difficult to eject the capacitor 100. Therefore, the above-described timing circuit has been provided which enables a testing of the capacitor 100 by this conventional oscillator. If the test is correct, then the further movement of the rotating disc 185 releases the high pressure contact engagement of contactors 220 on capacitor 100 and the solenoid 465 is energized at the instant previously called $t_2$ when the capacitor 100 has been disengaged from contactors 220 and is in the correct position for ejection from slot 180 of rotating disc 185.

To further illustrate the operation of the electrical circuit, the following circuit values have been employed:

| | | |
|---|---|---|
| 299 | micromicrofarads | 100 |
| 304 | kiloohms | 10 |
| 307 | do | 47 |
| 308 | do | 47 |
| 309 | ohms | 2200 |
| 310 | micromicrofarads | 0.1 |
| 321 | do | 1000 |
| 324 | do | 1000 |
| 331 | ohms | 2200 |
| 345 | kiloohms | 10 |
| 346 | do | 10 |
| 350 | do | 100 |
| 355 | micromicrofarads | 1000 |
| 356 | do | 1000 |
| 361 | ohms | 2200 |
| 362 | micromicrofarads | 1000 |
| 410 | kiloohms | 470 |
| 412 | megaohms | 2 |
| 413 | microfarads | 0.01 |
| 416 | ohms (variable) | 500 |
| 427 | kiloohms | 68 |
| 428 | do | 39 |
| 431 | do | 110 |
| 441 | ohms | 4700 |
| 442 | kiloohms | 47 |
| 467 | microfarads | 10 |
| 470 | megaohms | 15 |

Obviously these contacts will be chosen according to the tubes used, the frequency at which all oscillations resonate, the time delay needed, and the power needed to operate relay 460 and solenoid 465.

In the foregoing I have described my invention solely in connection with specific illustrative embodiments thereof. Since many variations and modifications of the invention will now be obvious to those skilled in the art, I prefer to be bound not by the specific disclosures herein contained but only by the appended claims.

We claim:

1. Apparatus for testing the capacitance of disc capacitors comprising a capacitor feeding mechanism, an electrical circuit for testing the capacitance of said capacitors and an electromagnetic circuit for ejecting said capacitors from said feeding mechanism at the end of the capacitance test, said electrical circuit comprising an oscillator circuit, a limiter circuit, a band pass filter, a Wheatstone bridge, and a trigger circuit, the output of said trigger circuit being connected to said electromagnetic circuit; said feeding mechanism moving said capacitors in contact with said testing circuit one at a time; said oscillator generating a signal of predetermined frequency for the correct capacitance of said capacitors; said signal being applied to an arm of said Wheatstone bridge through said limiter and band pass circuit; said Wheatstone bridge comprising two diodes and resistors in series; said signal unbalancing said bridge and producing a negative signal across one of said resistors; said resistor being the input of said trigger circuit; said trigger circuit comprising two direct coupled multi-element electron tubes; the first of said tubes being normally conductive, the second of said tubes being normally cut off, said negative pulse cutting off said first tube and applying a positive pulse to the control grid of said second tube; and making said second tube conductive, said electromagnetic circuit being connected to the output of second of said tubes and comprising a relay, a solenoid; said relay having a coil, two stationary contacts and an armature; the plate of the second of said tubes being connected to one of said stationary contacts and to one side of said relay coil; a power supply; the other side of said relay coil being connected to said power supply; means biasing said armature to the second of said stationary contacts; a timing capacitor; said timing capacitor being connected between said armature and ground; said solenoid coil being connected between said second stationary contact and ground, a discharging path between said armature and ground comprising high resistances; a locking circuit being formed at triggering of said trigger circuit, said locking circuit comprising said power supply, said relay coil, said first stationary relay, said relay armature and said timing capacitor, said timing capacitor charging through said locking circuit and making said relay armature return to said second stationary contact at the end of said charging operation; said solenoid being now energized by said timing capacitor and ejecting said capacitors from said feeding mechanism.

2. A capacitance testing apparatus comprising a capacitor feeding mechanism, an electrical circuit for testing the capacitance of said capacitors, means connecting said electrical circuit to said feeding mechanism, an electromagnetic circuit comprising solenoid means connected to said electrical circuit, said eletro-magnetic circuit energizing said solenoid means to eject said capacitors from said feeding mechanism at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine.

3. A capacitance testing apparatus comprising a capacitor feeding mechanism, an electrical circuit for testing the capacitance of said capacitors, means connecting said electrical circuit to said feeding mechanism, an electromagnetic circuit comprising solenoid means connected to said electrical circuit, said electro-magnetic circuit energizing said solenoid means to eject said capacitors from said feeding mechanism at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine, a motor driving said cams, said first cam and said second cam being connected to said motor in the correct time relationship to perform the said feeding operations.

4. A capacitance testing apparatus comprising a capacitor feeding mechanism, an electrical circuit for testing the capacitance of said capacitors, means connecting said electrical circuit to said feeding mechanism, an electromagnetic circuit comprising solenoid means connected to said electrical circuit, said electro-magnetic circuit energizing said solenoid means to eject said capacitors from said feeding mechanism at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine, a motor driving said cams, said first cam and said second cam being connected to said motor in the correct time relationship to perform the said feeding operations, a rotatable disc positioned at the output of said magazine having a plurality of slots, said capacitors falling from said magazine into said slots as said disc rotates.

5. A capacitance testing apparatus comprising a capacitor feeding mechanism, an electrical circuit for testing the capacitance of said capacitors, means connecting said electrical circuit to said feeding mechanism, an electro-magnetic circuit comprising solenoid means connected to said electrical circuit, said electro-magnetic circuit energizing said solenoid means to eject said capacitors from said feeding mechanism at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine, a motor driving said cams, said first cam and said second cam being connected to said motor in the correct time relationship to perform the said feeding operations, a rotatable disc positioned at the output of said magazine having a plurality of slots, said capacitors falling from said magazine into said slots as said disc rotates, said disc being rotated by the said motor in the correct time sequence with respect to said cams.

6. A capacitance testing apparatus comprising a capacitor feeding mechanism, an electrical circuit for testing the capacitance of said capacitors, means connecting said electrical circuit to said feeding mechanism, an electromagnetic circuit comprising solenoid means connected to said electrical circuit, said electro-magnetic circuit energizing said solenoid means to eject said capacitors from said feeding mechanism at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine, a motor driving said cams, said first cam and said second cam being connected to said motor in the correct time relationship to perform the said feeding operations, a rotatable disc positioned at the output of said magazine having a plurality of slots, said capacitors falling from said magazine into said slots as said disc rotates, two stationary plates, one on each side of said rotating disc, a number of conductors mounted on said plates, said plates having a number of openings equal to the number of said conductors, each of said openings being located after its corresponding conductor and a second motor rotating said disc in the correct direction.

7. A capacitance testing apparatus comprising a capacitor feeding mechanism, an electrical circuit for testing the capacitance of said capacitors, means connecting said electrical circuit to said feeding mechanism, an electromagnetic circuit comprising solenoid means connected to said electrical circuit, said electro-magnetic circuit from said feeding mechanism at the end of the capacitance from said feeding mechanisc at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine, a motor driving said cams, said first cam and said second cam being connected to said motor in the correct time relationship to perform the said feeding operations, a rotatable disc positioned at the output of said magazine having a plurality of slots, said capacitors falling from said magazine into said slots as said disc rotates, two stationary plates, one on each side of said rotating disc, a number of conductors mounted on said plates, said plates having a number of openings equal to the number of said conductors, each of said openings being located after its corresponding conductor, said disc being rotated by the said motor in the correct direction and in the correct time sequence with respect to said cams.

8. A capacitance testing apparatus comprising a capacitor feeding mechanism, an electrical circuit for testing the capacitance of said capacitors, means connecting said electrical circuit to said feeding mechanism, an electro-magnetic circuit comprising solenoid means connected to said electrical circuit, said electro-magnetic circuit energizing said solenoid means to eject said capacitors at the end of the capacitance test, said feeding mechanism, said testing circuit and said ejecting circuit operating in a predetermined time sequence, said capacitor feeding mechanism comprising a hopper, said hopper having longitudinal channels and a front opening, a chute located in alignment with said opening, a magazine at one end of said chute to receive said capacitors at the operative position of said chute, a first cam operating said hopper to a position for feeding said capacitor to said chute, said channels directing said capacitors to said front opening and into said chute, a second cam operating said chute, said chute being at this time inoperative, said second cam operating said capacitor filled chute to the said operative position for feeding said capacitor to said magazine, a motor driving said cams, said first cam and said second cam being connected to said motor in the correct time relationship to perform the said feeding operations.

9. Apparatus for testing the capacitance of tubular capacitors comprising a capacitor feeding mechanism, an electrical circuit for testing the capacitance of said capacitors, means connecting said electrical circuit to said feeding mechanism, an electro-magnetic circuit comprising solenoid means connected to said electrical circuit, said electro-magnetic circuit energizing said solenoid means to eject said capacitors from said feeding mechanism at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine.

10. Apparatus for testing the capacitance of tubular capacitors comprising a capacitor feeding mechanism, an electrical circuit for testing the capacitance of said capacitors, means connecting said electrical circuit to said feeding mechanism, an electro-magnetic circuit comprising solenoid means connected to said electrical circuit, said electro-magnetic circuit energizing said solenoid means to eject said capacitors from said feeding mechanism at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine, a motor driving said cams, said first cam and said second cam being connected to said motor in the correct time relationship to perform the said feeding operations.

11. Apparatus for testing the capacitance of tubular capacitors comprising a capacitor feeding mechanism, an electrical circuit for testing the capacitance of said capacitors, means connecting said electrical circuit to said feeding mechanism, an electromagnetic circuit comprising solenoid means connected to said electrical circuit, said electro-magnetic circuit energizing said solenoid means to eject said capacitors from said feeding mechanism at the end of the capacitance test, said feeding mechanism, said testing circuit and said ejecting circuit operating in a predetermined time sequence, said capacitor feeding mechanism comprising a hopper, said hopper having an opening, a chute located in alignment with said opening, a magazine at one end of said chute to receive said capacitors at the operative position of said chute, a first cam operating said hopper, a second cam operating said chute, said first cam moving said hopper to an inclined position causing said capacitors to slide through said opening into said chute, said chute being at this time inoperative, said second cam operating said capacitor filled chute to said operative position for feeding said capacitors to said magazine, a motor driving said cams, said first cam and said second cam being connected to said motor in the correct time relationship to perform the said feeding operations, a rotatable disc positioned at the output of said magazine having a plurality of slots, said capacitors falling from said magazine into said slots as said disc rotates, said disc being rotated by the said motor in the correct time sequence with respect to said cams.

12. Apparatus for testing the capacitance of tubular capacitors comprising a capacitor feeding mechanism, an electrical circuit for testing the capacitance of said capacitors, test terminals mounted on said feeding mechanism for successively engaging said capacitors, said test terminals being connected to said electrical circuit, said electrical circuit comprising an oscillator circuit, a limiter circuit connected at the output of said oscillator, a Wheatstone bridge, a band pass filter connecting said limiter circuit to said Wheatstone bridge, a trigger circuit connected to said Wheatstone bridge, an electromagnetic circuit comprising solenoid means connected to the output of said trigger circuit, the correct capacitance of individual capacitor engaged by said test terminals causing energization of said electrical circuit and said solenoid means, said solenoid means ejecting the said capacitor from said feeding mechanism.

13. Apparatus for testing capacitance of tubular capacitors comprising a capacitor feeding mechanism, an electrical circuit for testing the capacitance of said capacitor, test terminals mounted on said feeding mechanism for successively engaging said capacitors, said test terminals being connected to said electrical circuit, said electrical circuit comprising an osillator circuit, a limiter circuit connected at the output of said oscillator, a Wheatstone bridge, a band pass filter connecting said limiter circuit to said Wheatstone bridge, a trigger circuit connected to said Wheatstone bridge, an electromagnetic circuit comprising solenoid means connected to the output of said trigger circuit, said feeding mechanism comprising a rotating disc, a plurality of slots circularly located on said disc, said capacitors being positioned in said slots and rotating with said disc, one stationary plate on each side of said disc, said plates having a plurality of openings, said solenoids being mounted on one side of said plates in alignment with said openings, the correct capacitance of the individual capacitors engaged by said test terminals causing said band pass filter to pass a signal to energize said solenoid means, said solenoid means ejecting the said capacitor from said rotating disc through one of said openings.

14. Apparatus for testing the capacitance of tubular capacitors comprising a capacitor feeding mechanism, an electrical circuit for testing the capacitance of said capacitors, electrical contactors mounted on said feeding mechanism for successively engaging said capacitors, said contactors being connected to said electrical circuit, a plurality of electromagnetic circuits each comprising solenoid means and a relay, said electrical circuit comprising a plurality of oscillators, a limiter circuit connected at the output of said oscillators, Wheatstone bridges, frequency selective networks connecting said limiter circuits to said Wheatstone bridges, trigger circuits connected to said Wheatstone bridges, said electromagnetic circuits being connected to the output of said trigger circuits, said feeding mechanism comprising a rotating disc, a plurality of slots on the circumference of said disc, said capacitors in said slots rotating with said disc, one stationary plate on each side of said disc, said plates having a plurality of openings, each of said solenoid means being mounted on one side of said plates in alignment with one of said openings, the correct capacitance of the individual capacitors engaged by said electrical contactors causing said electrical circuit to selectively energize said solenoid means, said solenoid means ejecting the said capacitor from said feeding mechanism through its aligned opening.

References Cited in the file of this patent
UNITED STATES PATENTS

| | | |
|---|---|---|
| 1,768,449 | Heiny | June 24, 1930 |
| 1,957,222 | Mershon | May 1, 1934 |
| 1,983,388 | Moore | Dec. 4, 1934 |
| 2,016,455 | Purdy | Oct. 8, 1935 |
| 2,362,691 | Gaiser | Nov. 14, 1944 |
| 2,494,934 | Doucette | Jan. 17, 1950 |
| 2,546,314 | Merwin | Mar. 27, 1951 |
| 2,567,741 | Smith | Sept. 11, 1951 |